United States Patent [19]

Van Rosmalen et al.

[11] Patent Number: 5,117,413
[45] Date of Patent: May 26, 1992

[54] COIL DRIVE FOR PIVOTABLE MOUNTED OPTICAL SCANNER

[75] Inventors: Gerard E. Van Rosmalen; Pieter A. Schoneveld, both of Eindhoven, Netherlands

[73] Assignee: U.S. Philips Corporation, New York, N.Y.

[21] Appl. No.: 260,083

[22] Filed: Oct. 19, 1988

[30] Foreign Application Priority Data

Oct. 22, 1987 [NL] Netherlands ............... 8702521

[51] Int. Cl.$^5$ .............................. G11B 17/30
[52] U.S. Cl. ................... 369/215; 369/219; 369/222
[58] Field of Search .......... 369/215, 216, 219, 220, 369/222, 229, 244, 250, 251, 18, 43, 44.11, 44.14, 44.17; 360/104, 106, 105, 107

[56] References Cited

U.S. PATENT DOCUMENTS

| | | | |
|---|---|---|---|
| 4,150,407 | 4/1979 | Dijkstra | 369/106 |
| 4,382,293 | 5/1983 | Tajima et al. | 369/43 |
| 4,403,316 | 9/1983 | Van de Veerdonk | 369/215 X |
| 4,408,311 | 10/1983 | Suzuki et al. | 369/219 X |
| 4,481,550 | 11/1984 | Miller et al. | 369/43 X |
| 4,686,595 | 8/1987 | Bryer | 360/105 X |
| 4,794,586 | 12/1988 | Korth | 369/215 |

*Primary Examiner*—Benjamin R. Fuller
*Assistant Examiner*—Randy W. Gibson
*Attorney, Agent, or Firm*—David R. Treacy

[57] ABSTRACT

In order to pivot a pivotal arm (60) carrying an optical scanner (5), use is made of at least one coil (13) and at least one permanent magnet (16, 17), the coil being arranged on the pivotal arm or on a frame supporting the arm and the permanent magnet being arranged on the frame or on the arm. The coil (13) has a substantially straight active coil section (14) which is arranged near the pivotal axis (8) about which the pivotal arm is pivotable and which extends transversely of the longitudinal axis of the pivotal arm. The ends of this coil section are interconnected by a further coil section (15) which is, for example, concentric with the pivotal spindle and which extends at that side of the pivotal axis which is remote from the scanning unit.

8 Claims, 3 Drawing Sheets

COIL DRIVE FOR PIVOTABLE MOUNTED OPTICAL SCANNER

The invention relates to an apparatus for recording and/or reading recording tracks in a recording surface of a disc by means of a scanning unit. The apparatus includes a frame with a disc-supporting member which is rotatable about an axis of rotation, and a pivotal arm which supports the scanning unit and which is pivotable relative to the frame between two extreme pivotal positions about a pivotal spindle defining a pivotal axis parallel to the axis of rotation. Two pivotal elements include at least one coil and at least one permanent-magnet body, one of the pivotal elements being connected to the pivotal arm and the other pivotal element being connected to the frame.

European Patent Specification 0,074,131 discloses apparatus which employs two coils arranged at opposite sides of and spaced from the pivotal axis, which coils cooperate with permanent magnets arranged opposite these coils. Such an arrangement of magnets and coils occupies a comparatively large amount of space, and in addition the requirement that the spindle about which the pivotal arm is pivoted should be robust enough to take up the obtaining transverse forces may also be in conflict with the miniaturisation of such a construction.

SUMMARY OF THE INVENTION

The coil has an active portion of each turn of a coil section which is situated near the pivotal axis of the pivotal arm which is at least substantially straight. If the pivotal arm is in a central position midway between the two extreme pivotal two pivotal positions, the straight section extends at least substantially transversely of and symmetrically relative to the connecting line between the pivotal axis of the pivotal arm and the optical axis of the objective. The ends of this active portion are interconnected by a further portion which is disposed around and spaced from the pivotal axis of the pivotal arm and which is situated at that side of the pivotal axis which is remote from objective. The active portion is arranged opposite the poles of the magnet body, a torque about the pivotal axis being exerted on the pivotal arm when the coil is energised.

The construction can be very compact, enabling an effective torque to be exerted on the pivotal arm over a comparatively large pivoting angle so that transverse forces on the parts supporting the pivotal arm are at least substantially precluded.

German Offenlegungsschrift 2,744,233 describes an apparatus which utilises a triangular coil arranged so that one of the legs of this triangular coil is at least substantially concentric with the pivotal spindle of the pivotal arm and the two other legs extend at least substantially radially towards the pivotal axis from this concentric limb. However, when such a construction is utilised the supporting means of the pivotal arm will also be subjected to undesirable transverse forces.

U.S. Pat. No. 4,408,311 (herewith incorporated by reference) describes an optical tracking device including two spaced-apart magnetic yokes each having a magnet and a coil secured to a pivotal arm and movable in an air gap formed in the yokes. Each coil has two active coil sections which extend radially of the pivotal axis of the pivotal arm, one coil section being disposed opposite a northpole and the other opposite a southpole. When the coil is energized the radial coil sections are subjected to two mutually perpendicular forces, producing a resultant force which exerts a torque on the pivotal arm so that this arm is pivoted. A disadvantage of this construction is that the supporting means of the pivotal arm is subjected to a reactive force which may give rise to parasitic resonances in the frame, which may lead to instabilities in the tracking control system. Moreover, when the energising current is reversed, the coil may give rise to hysteresis effects in the control system, which inter alia lead to a bandwidth reduction.

U.S. Pat. No. 4,150,407 (herewith incorporated by reference) describes a drive arrangement for a pivotal arm carrying magnetic heads. The known device, whose bandwidth need only be limited, comprises two stationary metal plates with magnets between which a coil is interposed, which coil is secured to the pivotal arm and comprises two substantially parallel active coil sections. This known arrangement enables a large resultant force for pivoting the pivotal arm to be obtained, but the arrangement has drawbacks similar to those of the known tracking device described above.

Japanese Patent Application 59-68846 discloses a pivotal-arm comparatively for an optical player. In this known construction the pivotal arm is driven at a comparatively large distance from the pivotal axis by means of a drive arrangement comprising a stationary magnetic yoke and a coil, which is secured to the pivotal arm. As a result of the comparatively large distance between the coil and the pivotal axis this known construction exhibits hardly any relationship with the apparatus in accordance with the invention.

DETAILED DESCRIPTION OF THE PREFERRED EMBODIMENT

Figure 1:
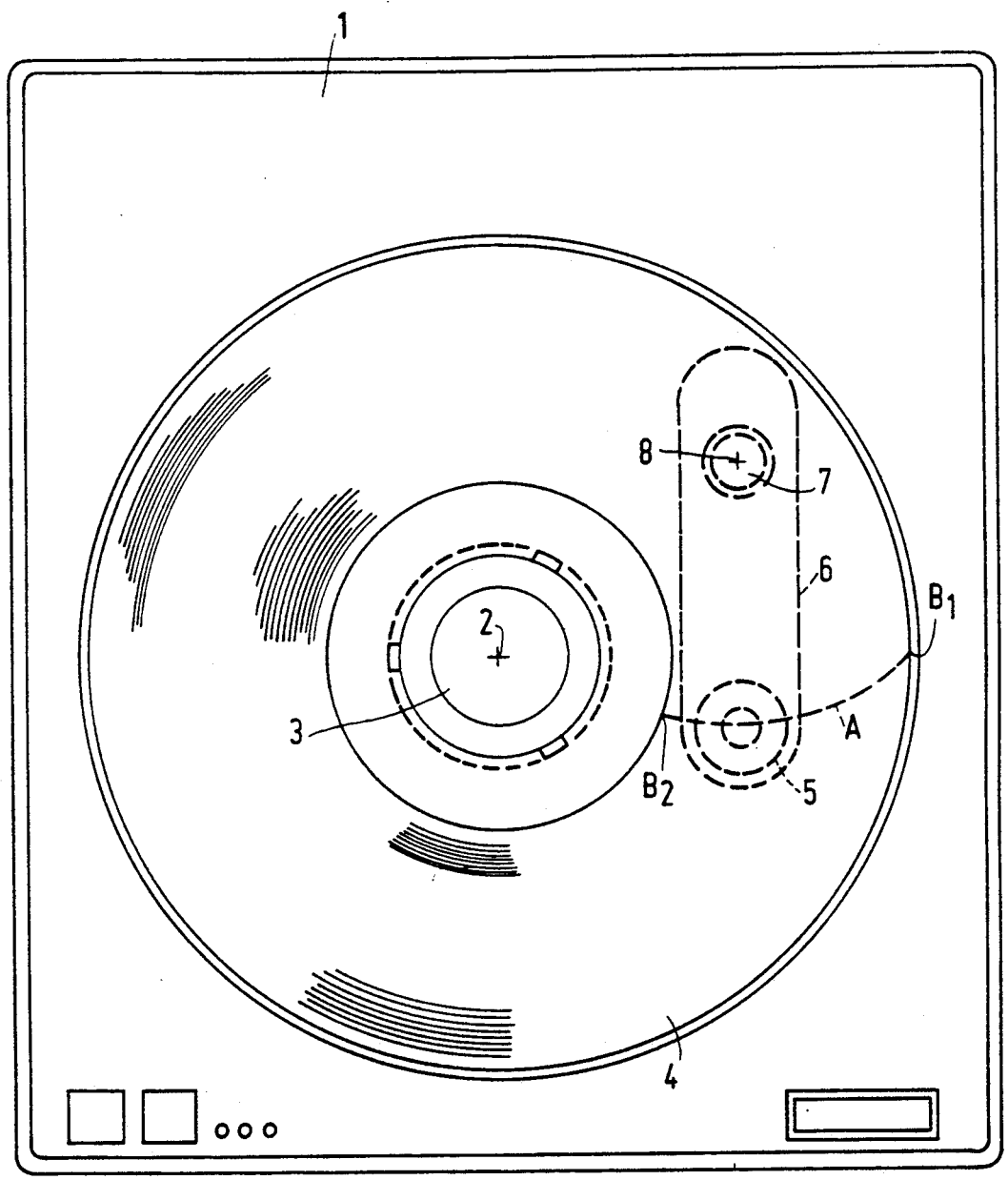
FIG. 1 is a diagrammatic plan view.

The apparatus in accordance with the invention, which in the present example constitutes an optical audio disc player, comprises a frame 1 in which a supporting member 3 for an optical audio disc 4, in particular a Compact Disc, is journalled, which member is rotatable about a vertical axis of rotation 2. During operation the supporting member 3 can be rotated about its axis of rotation in known manner by drive means, not shown.

In operation the disc 4 can be read in a manner known per se by an optical scanning unit 5, which is shown diagrammatically and which is arranged on an end portion of a pivotal arm 6. The scanning unit comprises an objective 55 having an optical axis 55A. During operation the pivotal arm 6 is pivotable about a pivotal axis 8 which coincides with the central axis of a spindle 7 which supports the arm. During operation the scanning unit is pivoted in the customary manner along an arc of circle A between two extreme pivotal positions $B_1$ and $B_2$ for recording and/or reading the recording tracks on the disc 4.

This pivotal movement of the pivotal arm is performed in a customary manner by means of pivoting elements comprising one or more coils, through which durinq operation a current is fed by suitable control means, and one or more permanent magnets. In the embodiment shown in FIGS. 2 and 3 two journals 7' and 7" constituting the spindle 7 and two bearings 9 support the arm 6 in two mutually parallel supporting plates 10 which form part of the frame 1 and which comprise edge portions 11 bent towards each other and flanges 12 secured to each other.

A coil 13 is connected to the arm 6 and comprises a straight active torque generating first coil section or portion 14 and an arcuate second coil section or portion 15 interconnecting the ends of this straight coil section. The coil section 14 extends perpendicularly to the central axis of the pivotal arm 6, i.e. the connecting line between the pivotal axis 8 and the optical axis 55A of the objective 55. For this purpose, as is shown diagrammatically in FIG. 2, the coil 13 is arranged in a recess formed in the arm 6. At the side of the pivotal axis 8 which is remote from the optical scanning unit 5; the coil section 15 extends between the ends of the coil section 14 in such a way that it is at least substantially concentric with this pivotal axis 8. The coil section 15 may serve to a counterpoise the scanning unit 5.

Figure 2:
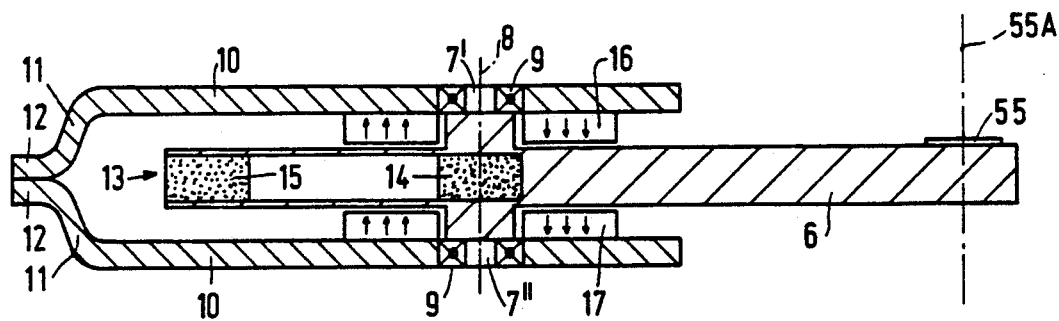
FIG. 2 is a diagrammatic cross-sectional view of a part of a pivotal arm; with the coil supported by this arm and the parts supporting the pivotal arm.
Figure 3:
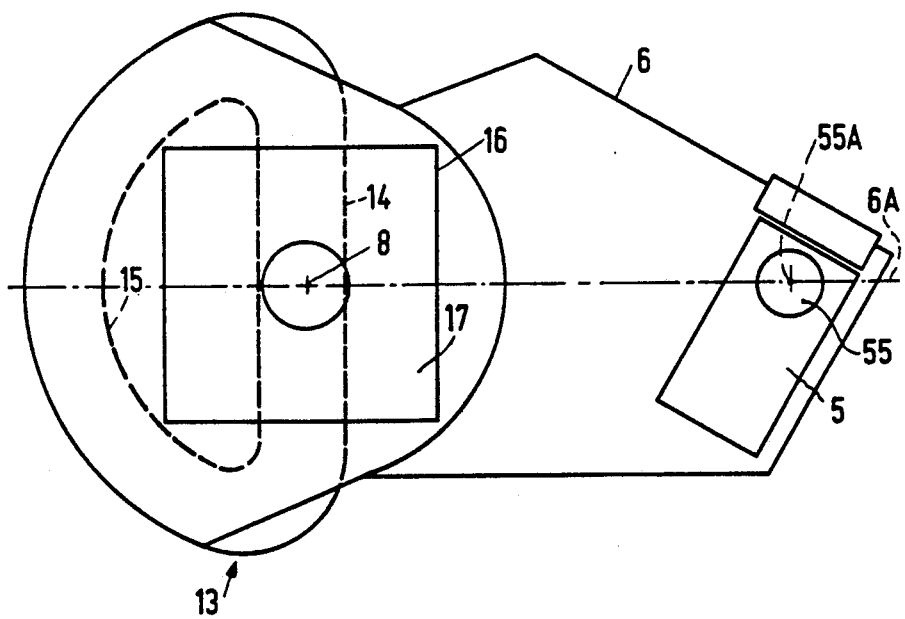
FIG. 3 is a diagrammatic plan view of the arrangement of the magnets and the pivotal arm shown in FIG. 2.

Above and underneath the coil flat permanent magnets 16 and 17 are secured to the facing bounding surfaces of the supporting plates 10, with opposite polarities. As is shown in FIGS. 2 and 3, the magnet plates 16 and 17 can be square or rectangular. Rectangular magnets have the advantage that a variable torque can be exerted on the arm, so that the loop gain in the control loop can be maintained constant. The magnets are arranged in such a way that the bounding line between these two magnets 16 and 17 at least substantially coincides with the longitudinal axis 6A of the pivotal arm in the central position of the pivotal arm, i.e. in the position midway between the two extreme pivotal positions $B_1$ and $B_2$.

Figure 4:
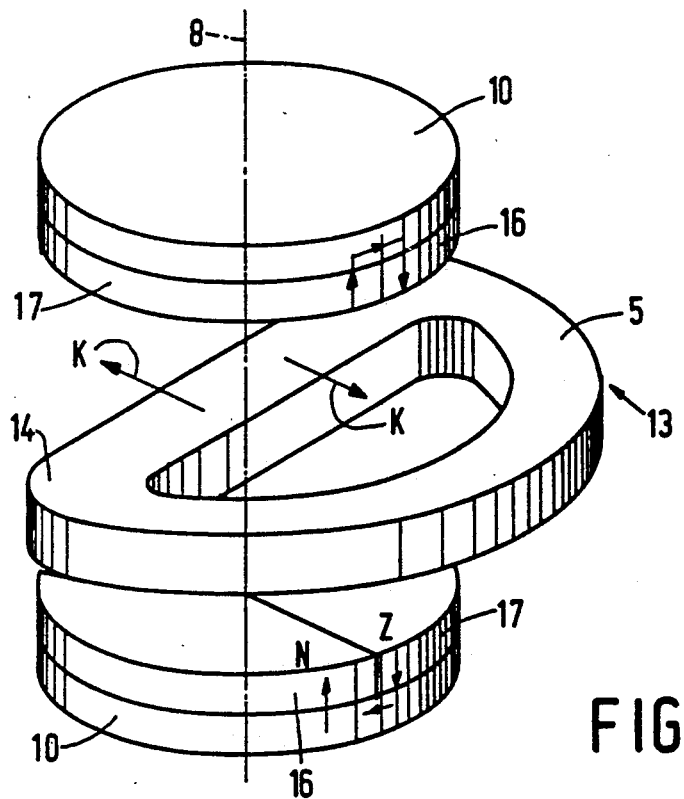
FIG. 4 is a diagrammatic perspective view of the coil and magnet arrangement.

FIG. 4 shows diagrammatically and in perspective the arrangement of the magnets and the coil described above, the magnets shown here not being rectangular to indicate that it is also possible to use magnets of different shape in the apparatus in accordance with the invention. As is further shown in this Figure, the metal supporting plates 10 serve as flux-linkage plates for the magnetic field, of each magnet pair, resulting in a short flux path, which promotes the magnet action and hence the efficiency of the apparatus. The path of the magnetic flux, is as indicated by the arrows in FIG. 4.

It will be appreciated that when the coil 13 is energised a torque about the pivotal axis 8, as is indicated by means of the arrows K, will be exerted on the coil and consequently on the pivotal arm 6 connected to the coil, undesirable transverse forces being substantially precluded.

Further to what has been stated above about the use of the rectangular magnets 16 and 17, it is to be noted that in the central position of the pivotal arm 6 the coil 13, which is connected to the pivotal arm 6, is less susceptible to the forces exerted on the coil by the magnetic field than, for example, in one extreme pivotal positions. This is advantageous for a correct control of the pivotal movement of the arm, because in the central position of the pivotal arm the scanning unit moves between the tracks at least substantially perpendicularly to the longitudinal directions of the successive tracks, while in the extreme pivotal position the scanning unit moves between the tracks at an angle which differs from 90° relative to these tracks.

In the embodiment described with reference to FIGS. 2 to 4 a magnet coil is secured to the pivotal arm 6 and permanent magnets are arranged at opposite sides of this magnet coil.

Figure 5:
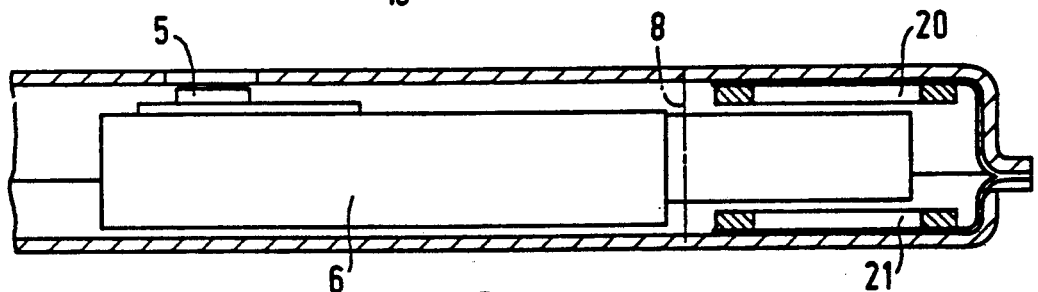
FIG. 5 is a partly sectional view of a second arrangement of a pivotal arm with magnets and coils.
Figure 6:
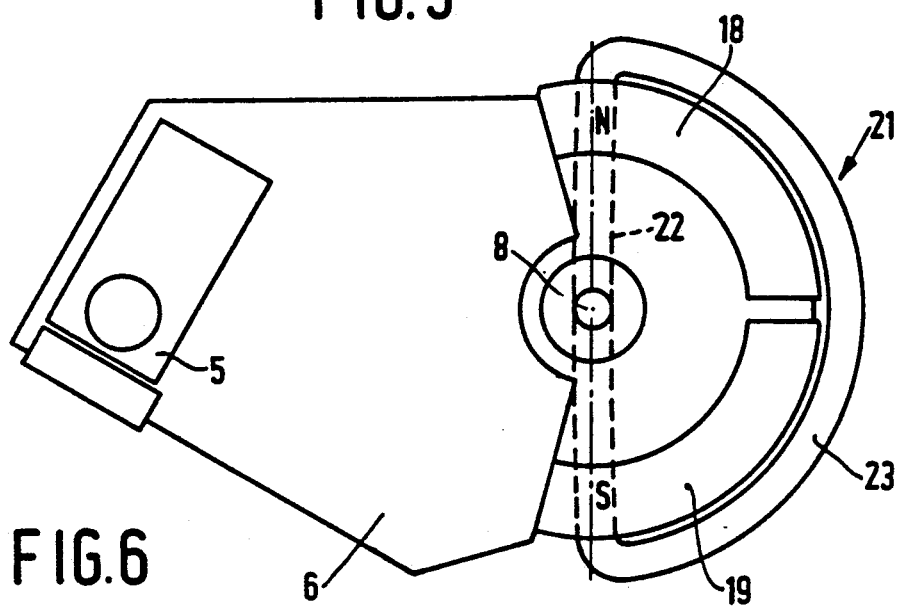
FIG. 6 is a diagrammatic plan view of the pivotal arm with magnets and coils shown in FIG. 5.

However, as is shown in FIGS. 5 and 6, alternatively two flats permanent magnets 18 and 19 which are concentric with the pivotal axis 8 can be secured to the pivotal arm 6. As is evident in particular from FIG. 6, these permanent magnets 18 and 19 extend concentrically around the pivotal axis 8 over an angle slightly larger than 90° at opposite sides of the longitudinal axis of the arm 6. Above and underneath the end of the arm 6 carrying the magnet plates 18 and 19 corresponding coils 20 and 21 are secured to the supporting plates 10. As is shown in FIG. 6, each coil comprises a first coil section 22, which extends transversely of the longitudinal axis of the pivotal arm 6, in such a way that this coil section 20 is disposed symmetrically relative to the longitudinal axis of the pivotal arm 6, in the central position of the pivotal arm. The ends of the coil section 22 are interconnected by a coil section 23 which is substantially concentric with the pivotal axis 8 and which is arranged at that side of the pivotal axis 8 which is remote from the optical scanning unit 5.

For reasons of constructional engineering it may be difficult to achieve that the coil section 22 which extends transversely of the longitudinal axis of the pivotal arm, viewed in the longitudinal direction of the pivotal axis 8, coincides with this axis, but the effect pursued by the invention is also obtained to a satisfactory extent if this coil section 22 is arranged at a small distance from the pivotal axis 8.

If will be evident that in the embodiment shown in FIGS. 5 and 6 it is also possible to obtain a torque which effectively acts on the pivotal arm 6 substantially about the pivotal axis 8 if a current is fed through the coils 20 and 21. Another advantage of this embodiment is that no electrical conductors have to be coupled to the pivotal arm, because the coils are arranged on a supporting plate 10 which is stationary relative to the frame.

What is claimed is:

1. An apparatus for scanning recording tracks in a recording surface of a disc by means of a scanning unit comprising which said disc rotates about an axis of rotation during operation, the apparatus comprising a frame with a disc-supporting member which is rotatable about the axis of rotation, and a pivotal arm which supports the scanning unit and which is pivotable relative to the frame between two extreme pivotal positions about a pivotal spindle defining a pivotal axis which is located near an end of the pivotal arm opposite an end of the pivotal arm near the objective and which is parallel to the axis of rotation by means of two pivoting elements comprising at least one coil having at least one turn and at least one permanent-magnet body, one of the pivotal elements being connected to the pivotal arm and the other pivotal element being connected to the frame, characterized in that each said turn of the coil comprises an at least substantially straight active portion that interacts magnetically with said permanent-magnet body to produce a torque about said pivotal axis on said pivotal arm which is situated near the pivotal axis of the pivotal arm which active portion, if the pivotal arm is in a central position midway between the two extreme pivotal positions, extends at least substantially transversely of and symmetrically relative to a connecting line between the pivotal axis of the pivotal arm and an optical axis of the objective, opposite ends of each said active portion being interconnected by a respective further portion of each said turn of which is disposed around and spaced from the pivotal axis of the pivotal arm and which is situated at a side of the pivotal arm and which is situated at a side of the pivotal axis which is remote from the objective, and each active portion is arranged opposite poles of the permanent-magnet body, a torque about the pivotal axis being exerted on the pivotal arm when the coil is energised.

2. An apparatus as claimed in claim 1, characterized in that the magnet body comprises at least a pair of permanent magnets having a common bounding line which at least substantially coincides with the connecting line between the pivotal axis and the optical axis if the pivotal arm occupies a central position of the pivotal arm one magnet of said pair of magnets being directed towards each active portion with a northpole and the other magnet having a south pole directed toward the active portion.

3. An apparatus as claimed in claim 2, characterized in that a second pair of plate-shaped permanent magnets is provided, the coil being secured to the pivotal arm and the active portion being interposed between the two pairs of permanent magnets, facing poles of the two pairs of permanent magnets having opposite polarities.

4. An apparatus as claimed in claim 2 characterized in that the magnets are pairwise secured to plates made of a magnetisable material.

5. An apparatus as claimed in claim 4, characterized in that said plates form part of the frame.

6. An apparatus as claimed in claim 2, characterized in that the permanent magnets are plate shaped and rectangular.

7. An apparatus as claimed in claim 2, characterized in that the magnets are secured to the pivotal arm, and are disposed concentrically around the pivotal axis and symmetrically relative to a longitudinal axis of the pivotal arm, and in that, viewed along the pivotal axis, said respective stationarily arranged active portions are disposed at opposite sides of the pivotal arm.

8. An apparatus as claimed in claim 7, characterized in that the magnets each extend over an angle of substantially 90°.

* * * * *